US012288843B2

(12) United States Patent
Braida et al.

(10) Patent No.: US 12,288,843 B2
(45) Date of Patent: Apr. 29, 2025

(54) METHOD FOR THE PREPARATION OF A Li-P-S PRODUCT AND CORRESPONDING PRODUCTS

(71) Applicants: SPECIALTY OPERATIONS FRANCE, Lyons (FR); Le Centre National de la Recherche Scientifique, Paris (FR); UNIVERSITE DE PICARDIE JULES VERNE, Amiens (FR)

(72) Inventors: Marc-David Braida, Bry-sur-Marne (FR); Ömer Ulas Kudu, Amiens (FR); Christian Masquelier, Boves (FR); Thierry Le Mercier, Rosny-sous-Bois (FR); Benoit Fleutot, Boucherville, CA (US)

(73) Assignees: SPECIALTY OPERATIONS FRANCE, Lyons (FR); LE CENTRE NATIONAL DE LA RECHERCHE SCIENTIFIQUE, Paris (FR); UNIVERSITE DE PICARDIE JULES VERNE, Amiens (FR)

( * ) Notice: Subject to any disclaimer, the term of this patent is extended or adjusted under 35 U.S.C. 154(b) by 546 days.

(21) Appl. No.: 17/630,541

(22) PCT Filed: Sep. 4, 2020

(86) PCT No.: PCT/EP2020/074881
§ 371 (c)(1),
(2) Date: Jan. 27, 2022

(87) PCT Pub. No.: WO2021/044042
PCT Pub. Date: Mar. 11, 2021

(65) Prior Publication Data
US 2022/0263123 A1    Aug. 18, 2022

(30) Foreign Application Priority Data

Sep. 6, 2019    (EP) .................................... 19306075

(51) Int. Cl.
*C01B 25/14*    (2006.01)
*H01B 1/10*    (2006.01)
*H01M 10/0562*    (2010.01)

(52) U.S. Cl.
CPC ......... *H01M 10/0562* (2013.01); *C01B 25/14* (2013.01); *H01B 1/10* (2013.01); *C01P 2002/72* (2013.01); *C01P 2002/77* (2013.01); *C01P 2002/82* (2013.01); *C01P 2006/40* (2013.01); *H01M 2300/0068* (2013.01)

(58) Field of Classification Search
None
See application file for complete search history.

(56) References Cited

FOREIGN PATENT DOCUMENTS

JP    2019071210 A    5/2019

OTHER PUBLICATIONS

Miura A. et al., "Liquid-phase syntheses of sulfide electrolytes for all-solid-state lithium battery", Nature Reviews Chemistry, 2019, vol. 3, No. 3, pp. 189-198,—Nature Publishing Group UK, London.
Kudu Ö. U. et al., "A review of structural properties and synthesis methods of solid electrolyte materials in the Li2S—P2S5 binary system", Journal of Power Sources, 2018, vol. 407, pp. 31-43, Elsevier B.V.
Wenzel S. et al., "Interphase formation and degradation of charge transfer kinetics between a lithium metal anode and highly crystalline Li7P3S11 solid electrolyte", Solid State Ionics, 2016, vol. 286, pp. 24-33, Elsevier B.V.
Yamane H. et al., "Crystal structure of a superionic conductor, Li7P3S11", Solid State Ionics, 2007, vol. 178, No. 15-18, pp. 1163-1167, Elsevier B.V.
Wang Y. et al., "Mechanism of Formation of Li7P3S11 Solid Electrolytes through Liquid Phase Synthesis", Chemistry of Materials, 2018, vol. 30, Issue 3, p. 990-997—American Chemical Society.
Ito S. et al., "A synthesis of crystalline Li7P3S11 solid electrolyte from 1,2-dimethoxyethane solvent", J. of Power Sources, 2014, vol. 271, pp. 342-345, Elsevier B.V.
Xue B. et al., "Solvent-assisted ball milling for synthesizing solid electrolyte Li7P3S11", Journal of the American Ceramic Society, 2019, vol. 102, Issue 6, p. 3402-3410.
Neuberger S. et al., "Refinement of the crystal structure of U4P2S6 using NMR crystallography", Dalton Transactions, 2018, vol. 47, issue 33, p. 11691-11695, The Royal Society of Chemistry.
Dietrich C. et al., "Local Structural Investigations, Defect Formation, and Ionic Conductivity of the Lithium Ionic Conductor Li4P2S6", Chem. Of Mater., 2016, vol. 28, p. 8764-8773, American Chemical Society.
Tachez M. et al., "Ionic conductivity of and phase transition in Li thiophosphate Li3PS4", Solid State Ionics, 1984, vol. 14, p. 181-185.
Tatsumisago M. et al., "New lithium ion conducting glass-ceramics prepared from mechanochemical Li2S—P2S5 glasses", Solid State Ionics, 2002, vol. 154-155, p. 635-640, Elsevier Science B.V.
Dietrich C. et al., "Lithium ion conductivity in Li2S—P2S5 glasses—building units and local structure evolution during the crystallization of superionic conductors Li3PS4, Li7P3S11 and Li4P2S7", J. Mater. Chem. A., 2017, vol. 5, p. 18111-18119,The Royal Society of Chemistry.
Seino Y. et al., "A sulphide lithium super ion conductor is superior to liquid ion conductors for use in rechargeable batteries", Energy Environ. Sci., 2014, vol. 7, p. 627-631, The Royal Society of Chemistry.
Seino Y. et al., "Analysis of the structure and degree of crystallisation of 70Li2S—30P2S5 glass ceramic", J. Mater. Chem. A., 2015, vol. 3, p. 2756-2761, The Royal Society of Chemistry.

(Continued)

*Primary Examiner* — Sheng H Davis
(74) *Attorney, Agent, or Firm* — Osha Bergman Watanabe & Burton LLP

(57) ABSTRACT

The present invention concerns a new method for the preparation of a Li—P—S product, as well as the products obtainable by said methods, and uses thereof especially as solid electrolytes.

6 Claims, 6 Drawing Sheets

(56) References Cited

OTHER PUBLICATIONS

Figure 1:
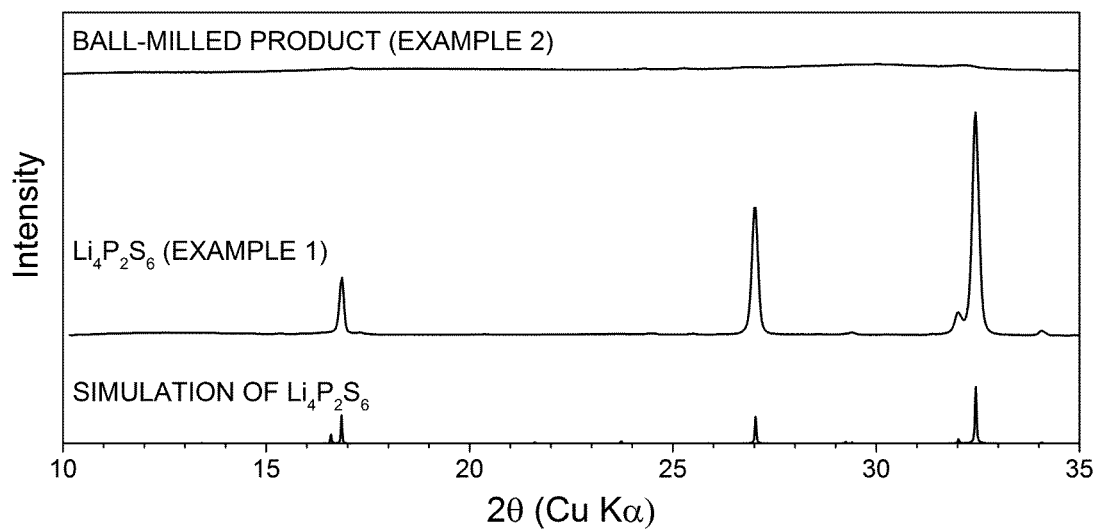

Aoki Y. et al., "Chemical and structural changes of 70Li2S-30P2S5 solid electrolyte during heat treatment", Solid State Ionics, 2017, vol. 310, p. 50-55, Elsevier B.V.

Minami K. et al., "Crystallization Process for Superionic Li7P3S11 Glass-Ceramic Electrolytes", J. Am. Ceram. Soc., 2011, vol. 94, p. 1779-1783, The American Ceramic Society.

Busche M.R. et al., "In Situ Monitoring of Fast Li-Ion Conductor Li7P3S11 Crystallization Inside a Hot-Press Setup", Chem. Mater., 106, vol. 28, p. 6152-6165, American Chemical Society.

Xu R.C. et al., "Preparation of Li7P3S11 glass-ceramic electrolyte by dissolution-evaporation method for all-solid-state lithium ion batteries", Electrochim. Acta., 2016, vol. 219, p. 235-240, Elsevier B.V.

Calpa M. et al., "Preparation of sulfide solid electrolytes in the Li2S—P2S5 system by a liquid phase process", Inorg. Chem. Front., 2018, vol. 5, p. 501-508, The Partner Organisations.

Chu I.H. et al., "Insights into the Performance Limits of the Li7P3S11 Superionic Conductor: A Combined First-Principles and Experimental Study", ACS Appl. Mater. Interfaces. 2016, issue 8, p. 7843-7853, American Chemical Society.

Minami K. et al., "Lithium ion conductivity of the Li2S—P2S5 glass-based electrolytes prepared by the melt quenching method", Solid State Ionics, 2007, vol. 178, pp. 837-841—Elsevier B.V.

METHOD FOR THE PREPARATION OF A Li-P-S PRODUCT AND CORRESPONDING PRODUCTS

This application is a U.S. national phase entry under 35 U.S.C. § 371 of International Application No. PCT/EP2020/074881, filed on Sep. 4, 2020, which claims priority to European Application No. 19306075.3, filed on Sep. 6, 2019. The entire contents of these applications are explicitly incorporated herein by this reference.

The present invention concerns a new method for the preparation of a Li—P—S product, as well as the products obtainable by said methods, and uses thereof especially as solid electrolytes.

PRIOR ART

Lithium batteries are used to power portable electronics and electric vehicles owing to their high energy and power density. Conventional lithium batteries make use of a liquid electrolyte that is composed of a lithium salt dissolved in an organic solvent. The aforementioned system arises security questions as the organic solvents are flammable. Lithium dendrites forming and passing through the liquid electrolyte medium can cause short circuit and produce heat, which result in accident that leads to serious injuries.

Non-flammable inorganic solid electrolytes offer a solution to the security problem. Furthermore, their mechanic stability helps suppressing lithium dendrite formation, preventing self-discharge and heating problems, and prolonging the life-time of a battery.

Solid sulfide electrolytes are advantageous for lithium battery applications due to their high ionic conductivities and mechanical properties. These electrolytes can be pelletized and attached to electrode materials by cold pressing, which eliminates the necessity of a high temperature assembly step. Elimination of the high temperature sintering step removes one of the challenges against using lithium metal anodes in lithium batteries.

There is thus a need for new solid sulfide electrolytes.

$Li_7P_3S_{11}$ is a Li—P—S product which possesses a very high Li+ conductivity ($1.4 \times 10^{-3}$ S cm$^{-1}$ at 25° C. after cold pressing) (Y. Seino, T. Ota, K. Takada, A. Hayashi, M. Tatsumisago, *A sulphide lithium super ion conductor is superior to liquid ion conductors for use in rechargeable batteries*, Energy Environ. Sci. 7 (2014) 627-631). However, until today, this product is prepared through processes that require the use of $Li_2S$ and $P_2S_5$ as reagents, which are not chemically stable in ambient atmosphere.

INVENTION

The aim of the present invention is to provide a new solid electrolyte, comprising in particular $Li_7P_3S_{11}$.

Another aim of the present invention is to provide a new process for the preparation of a Li—P—S product such as $Li_7P_3S_{11}$, without requiring the exclusive use of $Li_2S$ and $P_2S_5$ as reagents.

Another aim of the present invention is to provide a new process for the preparation of a Li—P—S product such as $Li_7P_3S_{11}$, without requiring working in a protected atmosphere for the whole process.

Therefore, the present invention relates to a method of preparing a Li—P—S product, the method comprising at least the following steps:

(a) mixing at least $Li_4P_2S_6$, $Li_2S$ and sulfur to obtain a first mixture;
(b) heating the first mixture in an inert atmosphere, under vacuum or under $H_2S$ flow, for a period of time and at a temperature sufficient to produce the Li—P—S product; and
(c) cooling and optionally powdering the Li—P—S product.

Such process is a new synthesis pathway for the synthesis of an important solid sulfide electrolyte, in particular metastable glass-ceramic $Li_7P_3S_{11}$, which possesses a very high Li+ conductivity ($1.4 \times 10^{-3}$ S cm$^{-1}$ at 25° C. after cold pressing as mentioned above).

Contrarily to the existing reaction pathways that require the use of only $Li_2S$ and $P_2S_5$ as reagents, which are not chemically stable in ambient atmosphere, this process uses an Li—P—S compound (i.e. $Li_4P_2S_6$) as a reagent for synthesis of another Li—P—S compound (i.e. abovementioned $Li_7P_3S_{11}$). The main advantage of this specific reaction is that it promotes the possibility of using $Li_4P_2S_6$ as the storage material in a dry room prior to the synthesis of $Li_7P_3S_{11}$, whereas the conventional reagents $Li_2S$ and $P_2S_5$ are needed to be stored in a protected atmosphere such as Ar or N.

Definitions

Throughout this specification, unless the context requires otherwise, the word "comprise" or "include", or variations such as "comprises", "comprising", "includes", including" will be understood to imply the inclusion of a stated element or method step or group of elements or method steps, but not the exclusion of any other element or method step or group of elements or method steps. According to preferred embodiments, the word "comprise" and "include", and their variations mean "consist exclusively of".

As used in this specification, the singular forms "a", "an" and "the" include plural aspects unless the context clearly dictates otherwise. The term "and/or" includes the meanings "and", "or" and also all the other possible combinations of the elements connected to this term.

The term "between" should be understood as being inclusive of the limits.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 120° C. to about 150° C. should be interpreted to include not only the explicitly recited limits of about 120° C. to about 150° C., but also to include sub-ranges, such as 125° C. to 145° C., 130° C. to 150° C., and so forth, as well as individual amounts, including fractional amounts, within the specified ranges, such as 122.2° C., 140.6° C., and 141.3° C., for example.

DETAILED INVENTION

The method of the invention thus leads to a Li—P—S product, that is to say a product comprising lithium (Li), phosphorus (P) and sulfur (S).

According to an embodiment, the Li—P—S product is chosen in the group consisting of: $Li_7P_3S_{11}$, $Li_3PS_4$, $Li_7PS_6$ and/or $Li_{96}P_3S_{12}$.

More preferably, the Li—P—S product is $Li_7P_3S_{11}$.

As mentioned above, step (a) of the process according to the invention consists in the preparation of a first mixture from $Li_4P_2S_6$, $Li_2S$ and sulfur.

Such step is carried out by implementing usual means well-known from the skilled person.

Preferably, step (a) consists in a chemo-mechanical or mechanochemical reaction.

Then, according to step (b), said mixture is heated in an inert atmosphere, under vacuum or under $H_2S$ flow, for a period of time and at a temperature sufficient to produce the Li—P—S product.

As mentioned above, step (b) may be carried out in an inert atmosphere or under vacuum. Step (b) may also comprise an additional sulfur source when this step is carried out under $H_2S$ flow.

Such heating step is carried out by implementing usual means well-known from the skilled person, for example using a sealed quartz tube, a batch furnace or a rotary furnace able to work under argon, nitrogen or $H_2S$ flow.

According to an embodiment, the temperature in step (b) is comprised from 150° C. to 600° C., preferably from 180° C. to 220° C.

According to an embodiment, the heating in step (b) is made over a period of time comprised from 1 hour to 200 hours, for example from 6 hours to 200 hours.

Step (c) consists in cooling the product obtained after step (b). Preferably, this product is cooled down until it reaches the room temperature. Such cooling step is carried out by implementing usual means well-known from the skilled person, such as for instance by letting the furnace going down at room temperature at a rate of 5° C./min.

In particular, this cooling is carried out under natural cooling for a time sufficient to obtain a cooled product having a temperature of about the room temperature. Within the present invention, the room temperature is defined as being of about 25° C.±2° C.

The method of the invention may also comprise a further step of powdering. Such step is carried out after the cooling step. Such powdering step is carried out by implementing usual means well-known from the skilled person, such as for instance, by crushing the sample in a mortar, or applying a low energy deagglomeration step.

Then, after step (c), the Li—P—S is recovered by any means well-known for the skilled person, such as for instance, sieving the powder.

According to an embodiment, $Li_4P_2S_6$ added in step (a) is obtained from the reaction between $Li_2S$ and $P_2S_5$. Such reaction is well described in prior art and well-known from the skilled person, such as for instance high temperature solid state reaction as described in (Solid State Ionics, 178 (2007), pp. 837-841).

The present invention also relates to the Li—P—S product obtainable by the method as defined above.

As mentioned above, the Li—P—S product is chosen in the group consisting of: $Li_7P_3S_{11}$, $Li_3PS_4$, $Li_7PS_6$ and/or $Li_{96}P_3S_{12}$. Preferably, the present invention thus relates to $Li_7P_3S_{11}$ obtainable by the method as defined above.

The implementation of the method of the invention gives a specific product of formula $Li_7P_3S_{11}$ having a crystal structure other than the crystal structure of the $Li_7P_3S_{11}$ obtained by the prior art methods.

So, the present invention also relates to a product of formula $Li_7P_3S_{11}$ having a crystal structure and a volume V per formula unit at room temperature comprised between 407 and 412 angstrom cube, as measured by X-Ray Diffraction.

The X-ray Diffraction (XRD) measurements were performed for example using Bragg-Brentano geometry with Cu K-alpha radiation within a D8 Bruker Diffractometer. The preferred measurement conditions were of 15 second per 0.03 degrees step.

The volume V per formula unit is determined using the cell (lattice) parameters acquired at standard atmosphere (101325 Pa) on powder samples.

The volume V per formula unit is the lattice volume V' divided by the number of formula units Z in a cell, and Z is equal to 2 (Solid State Ionics, 178 (2007), pp. 1163-1167).

As well known, V' is derived from cell (lattice) parameters (a, b, c, α, β, γ).

$$V'=a \cdot b \cdot c \cdot \mathrm{sqrt}(1+2 \cos \alpha \cdot \cos \beta \cdot \cos \gamma - \cos^2 \alpha - \cos^2 \beta - \cos^2 \gamma)$$

(a, b and c being (in Ångstroms (Å)) the lengths of sides (edges) and α, β and γ being the angles (°) between them)

According to an embodiment, the product of formula $Li_7P_3S_{11}$ according to the invention may also comprise an amorphous phase.

Preferably, the product of formula $Li_7P_3S_{11}$ according to the invention is a product wherein lattice (cell) parameters of the crystal structure, as measured by X-Ray Diffraction, are as follows:

a=12.40 Å according to the profile fitting
b=6.04 Å according to the profile fitting
c=12.52 Å according to the profile fitting According to an embodiment, the product of formula $Li_7P_3S_{11}$ according to the invention is a product wherein lattice (cell) parameters of the crystal structure, as measured by X-Ray Diffraction, are as follows:

alpha=103.30° according to the profile fitting
beta=113.25° according to the profile fitting
gamma=75.07° according to the profile fitting The present invention also relates to the use of the product as defined above, alone or in combination with any crystalline or amorphous conductive Li-material, as solid electrolyte.

Preferably, the present invention relates to the use of the product of formula $Li_7P_3S_{11}$ as defined above, in particular having a crystal structure and a volume V per formula unit at room temperature comprised between 407 and 412 angstrom cube, as measured by X-Ray Diffraction, alone, as solid electrolyte.

According to an embodiment, said product may be used in combination with any crystalline or amorphous conductive Li-material, such as for instance beta-$Li_3PS_4$ or glassy $Li_3PS_4$.

The present invention also relates to a solid electrolyte comprising at least one product as defined above.

Preferably, the solid electrolyte according to the invention comprises a product of formula $Li_7P_3S_{11}$ as defined above, in particular having a crystal structure and a volume V per formula unit at room temperature comprised between 407 and 412 angstrom cube, as measured by X-Ray Diffraction.

The present invention also relates to a battery, preferably a lithium battery comprising at least the Li—P—S product obtainable by the method of the invention or a product of formula $Li_7P_3S_{11}$ having a crystal structure and a volume V per formula unit at room temperature comprised between 407 and 412 angstrom cube, as measured by X-Ray Diffraction.

The battery where the product of the invention is used can be a lithium-ion or a lithium metal battery.

The battery is composed of a positive and a negative electrode with electroactive substances able to reversibly intercalate and de-intercalate lithium ions.

In the case of forming a positive electrode, the active substance may be selected from the group consisting of a composite metal chalcogenide represented by a general formula of $LiMY_2$, wherein M denotes at least one species of transition metals such as Co, Ni, Fe, Mn, Cr, Al and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), $Lix(Ni_{0.8}Co_{0.15}Al_{0.05})O_2$, $Li(Ni_{1/3}Co_{1/3}Mn_{1/3})O_2$, $Li(Ni_{0.6}Co_{0.2}Mn_{0.2})O_2$, $Li(Ni_{0.8}Co_{0.1}Mn_{0.1})O_2$ and spinel-structured $LiMn_2O_4$ and $LiMn_{1.5}Ni_{0.5}O_4$. These active materials may be coated with inorganic or organic coatings, such as $LiNbO_3$.

As an alternative, still in the case of forming a positive electrode, the active substance may comprise a lithiated or partially lithiated transition metal oxyanion-based electrode materials of the nominal formula $AB(XO_4)_fE_{1-f}$, in which A is lithium, which may be partially substituted by another alkali metal representing less that 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1.

The active substance for use in forming a positive electrode can also be sulfur or $Li_2S$.

In the case of forming a negative electrode, the active substance may preferably comprise a carbon-based material and/or a silicon-based material and/or lithium metal In some embodiments, the carbon-based material may be, for example, graphite, such as natural or artificial graphite, graphene, or carbon black.

These materials may be used alone or as a mixture of two or more thereof.

The carbon-based material is preferably graphite.

The silicon-based compound may be one or more selected from the group consisting of silicon, silicon carbide and silicon oxide.

The lithium metal may be used as a lithium foil or as lithium powder.

FIGURES

FIG. 1: Comparison of the XRD patterns of the simulated pattern of $Li_4P_2S_6$ [1], the synthesized $Li_4P_2S_6$ (Example 1), and the ball-milled product of the Reaction 1 (Example 2).

Figure 2:
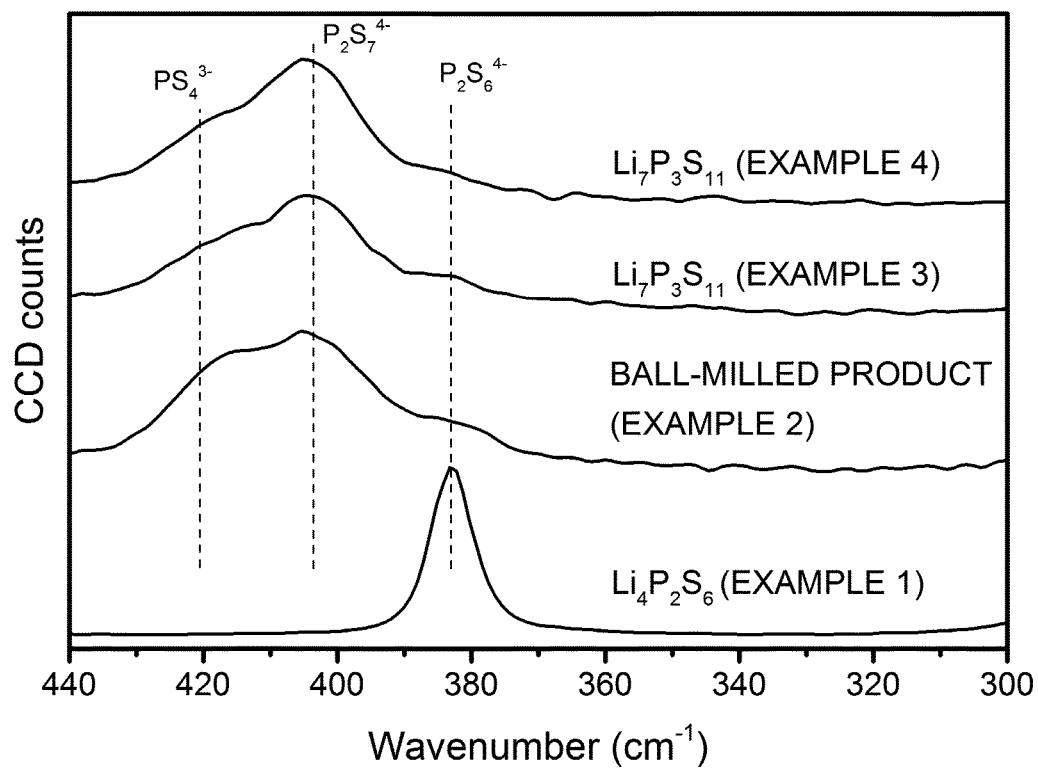

FIG. 2: Comparison of the Raman spectra of the synthesized $Li_4P_2S_6$ (Example 1), the ball-milled product of the Reaction 1 (Example 2), the crystalline $Li_7P_3S_{11}$ that is formed by annealing Example 2 (Example 3), and the crystalline $Li_7P_3S_{11}$ that was synthesized from the conventional reagents $Li_2S$ and $P_2S_5$.

Figure 3:
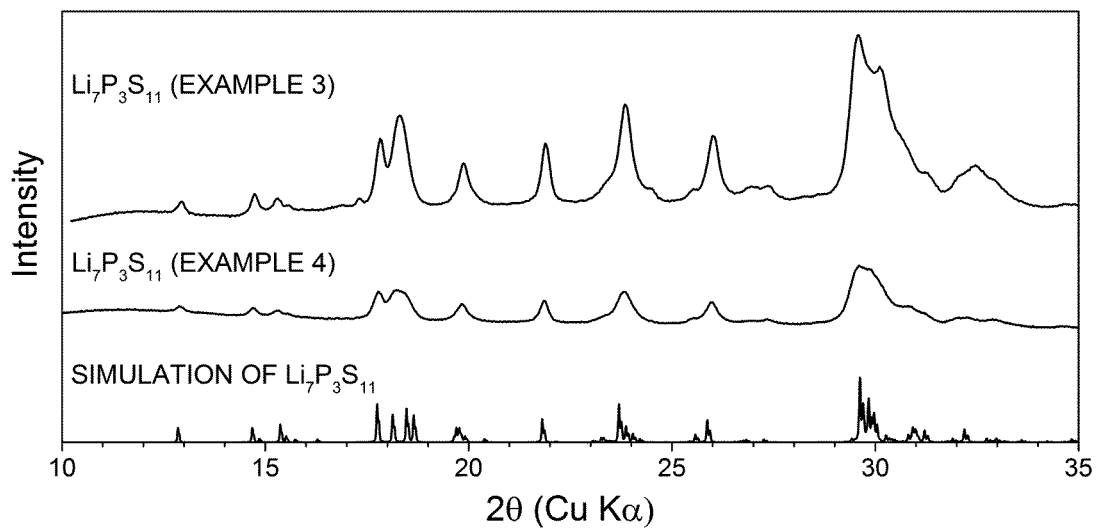

FIG. 3: Comparison of the XRD patterns of the crystalline $Li_7P_3S_{11}$ that is synthesized via the Reaction 1 (Example 3), the crystalline $Li_7P_3S_{11}$ that was synthesized from the conventional reagents $Li_2S$ and $P_2S_5$, and the simulated pattern of $Li_7P_3S_{11}$ [11].

Figure 4:
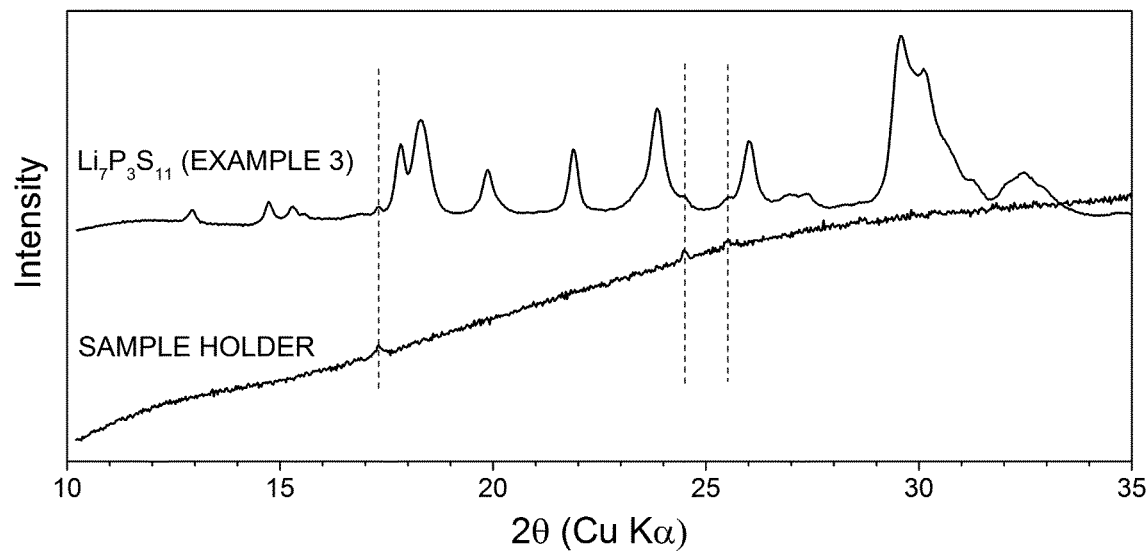

FIG. 4: Comparison of the XRD patterns of the crystalline $Li_7P_3S_{11}$ that is synthesized via the Reaction 1 (Example 3), and the empty Be-equipped sample holder.

Figure 5:
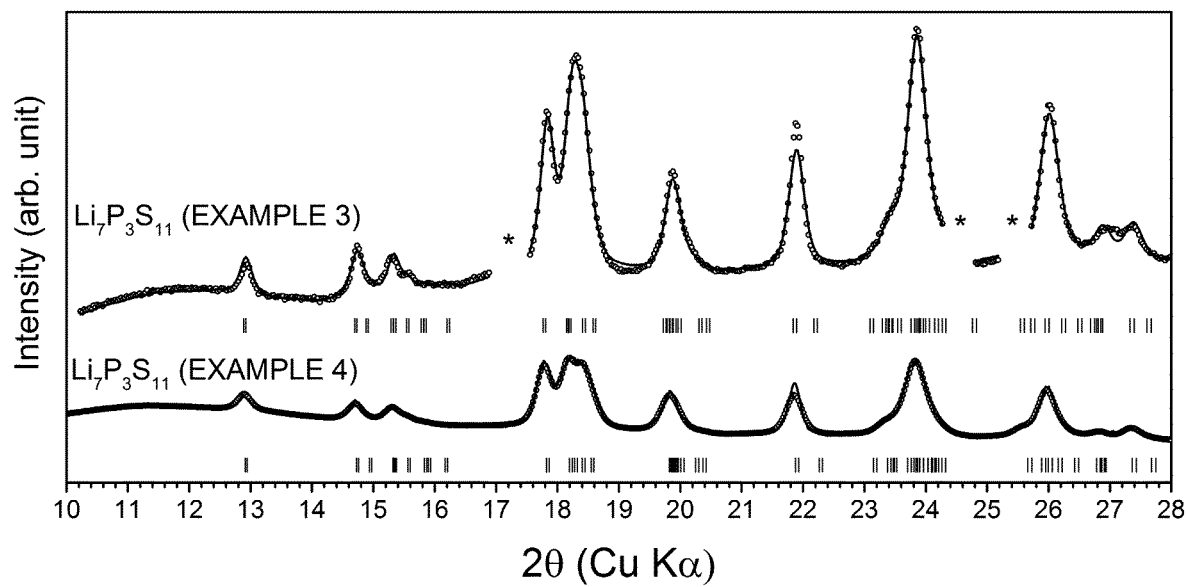

FIG. 5: Results of the profile fitting of Examples 4 and 3. The Bragg positions were indicated with black vertical lines, the fits were plotted with a solid black line, and the collected data were shown in black hollow spheres. The regions marked with asterisk were omitted from the fit as they involve the contribution of the sample holder as shown in FIG. 4.

Figure 6:
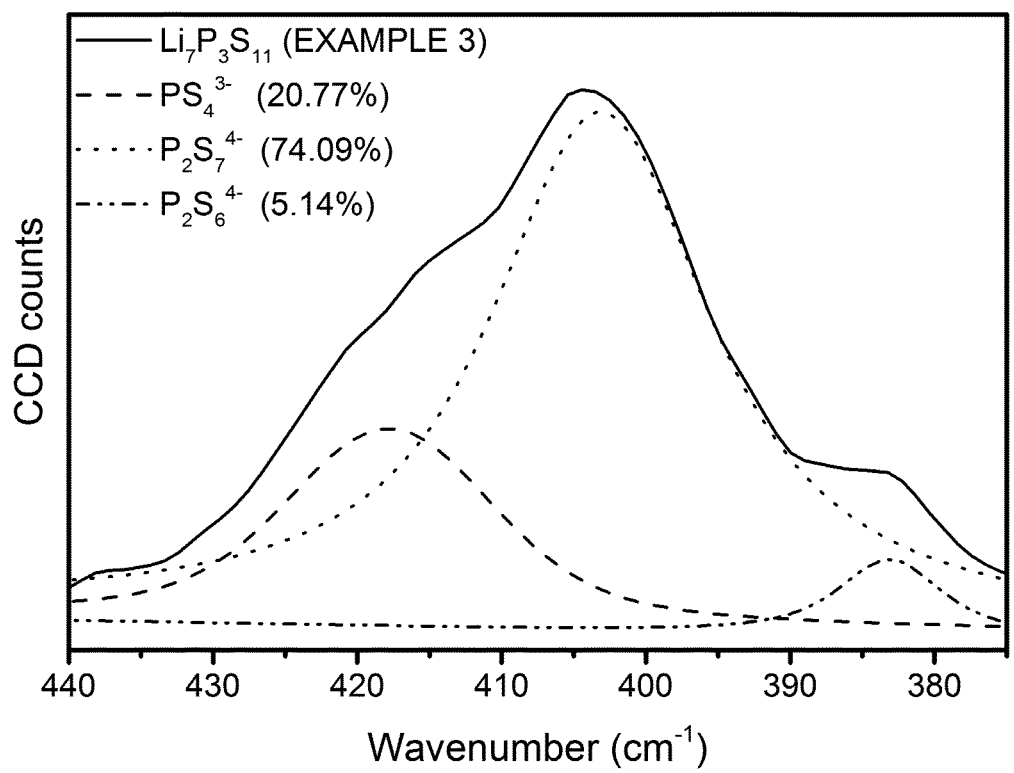

FIG. 6: Deconvolution of the signals coming from the structural moieties $PS_4^{3-}$, $P_2S_7^{4-}$ and $P_2S_6^{4-}$ in the Raman spectrum of Example 3. The relative ratios of the peak areas are also noted on the top left of the figure.

Figure 7:
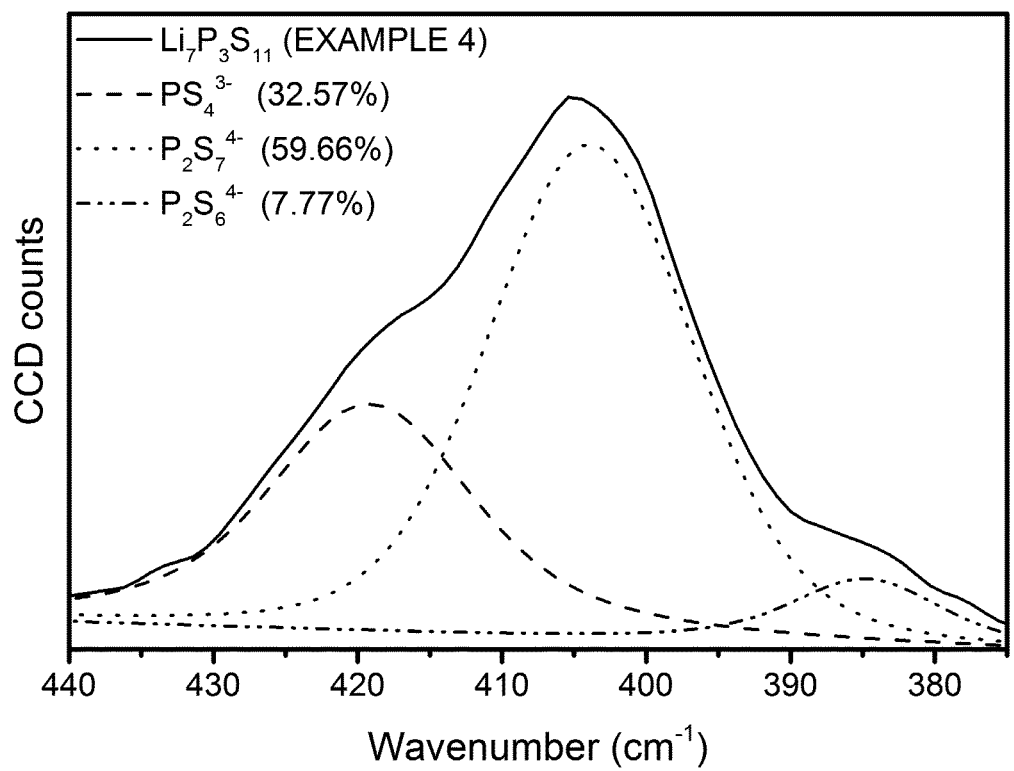

FIG. 7: Deconvolution of the signals coming from the structural moieties $PS_4^{3-}$, $P_2S_7^{4-}$ and $P_2S_6^{4-}$ in the Raman spectrum of Example 4. The relative ratios of the peak areas are also noted on the top left of the figure.

Figure 8:
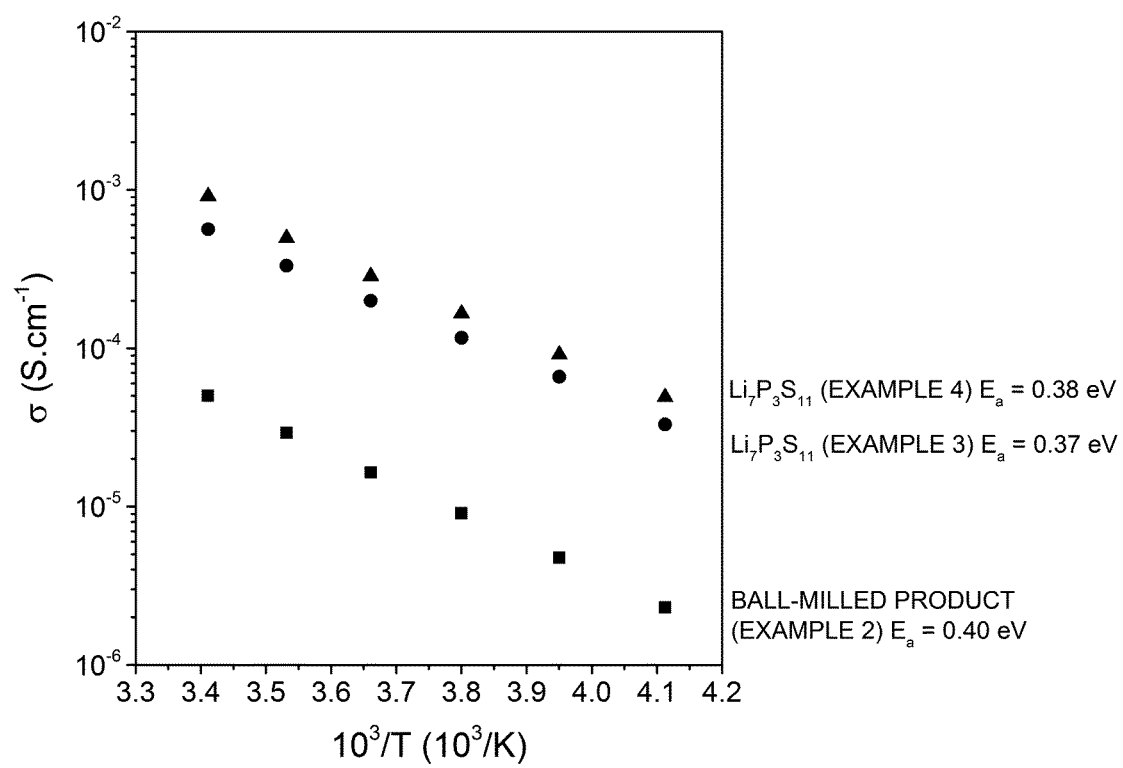

FIG. 8: Comparison of the ionic conductivity values versus inverse temperature (1/T) of the ball-milled product of the Reaction 1 (Example 2), the crystalline $Li_7P_3S_{11}$ that is synthesized via the Reaction 1 (Example 3), the crystalline $Li_7P_3S_{11}$ that was synthesized from the conventional reagents $Li_2S$ and $P_2S_5$.

Figure 9:
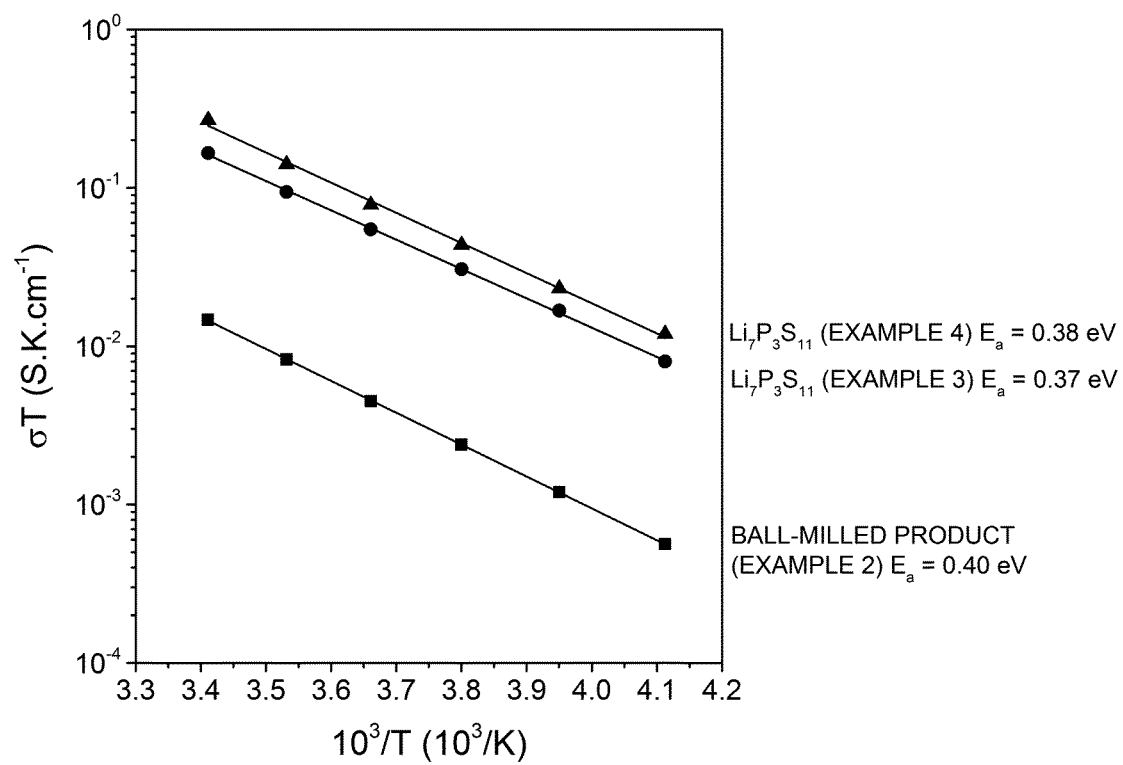

FIG. 9: Comparison of the σxT values versus inverse temperature (1/T) of the ball-milled product of the Reaction 1 (Example 2), the crystalline $Li_7P_3S_{11}$ that is synthesized via the Reaction 1 (Example 3), the crystalline $Li_7P_3S_{11}$ that was synthesized from the conventional reagents $Li_2S$ and $P_2S_5$. The linear fits to calculate the slope of the lines were also shown as solid black lines.

EXAMPLES

The disclosure will now be illustrated with working examples, which is intended to illustrate the working of disclosure and not intended to take restrictively to imply any limitations on the scope of the present disclosure. Other examples are also possible which are within the scope of the present disclosure.

Example 1

$Li_2S$ and $P_2S_5$ (both produced by Sigma Aldrich) were used as starting materials. 1.5 g of total powder at a molar ratio of 2:1 were put in a 45 mL $ZrO_2$ jar with 12 $ZrO_2$ balls (3 g/ball, 10 mm diameter) in an Ar filled glovebox. The jar was sealed with scotch and parafilm to prevent air exposure, then was taken out of the glovebox and was placed in Fritzch Planetary Micro Mill Pulverisette 7. It was ball-milled with 510 RPM rotating speed for 38 hours while employing 15 minute breaks in every 15 minutes of milling, in order to prevent excessive heating of the jar. The jar was then moved to an Ar filled glovebox to recover the powder. Then, the resulting white powder was pelletized at 530 MPa with a 6 mm diameter die. The pellet was vacuum sealed in a carbon coated quartz tube, then the tube was heated to 350° C. with 5° C./min heating rate, and was kept at the same temperature for 36 hours. After the annealing step, the tube was slowly cooled down to RT, and it was opened in an Ar filled glovebox.

Example 2

400 mg of Example 1, 46 mg of sulfur, and 22 mg of $Li_2S$ (produced by Sigma Aldrich) were mixed in an Ar filled glovebox to balance the reaction below:

$3Li_4P_2S_6 + 3S + Li_2S = 2Li_7P_3S_{11}$                 Reaction 1:

The mixture was put in a 45 mL $ZrO_2$ jar with 8 $ZrO_2$ balls (3 g/ball, 10 mm diameter). The jar was sealed with scotch and parafilm to prevent air exposure, then was taken out of the glovebox and was placed in Retsch PM200 Planetary Ball-milling Apparatus. It was ball-milled with 510 RPM rotating speed for 76 hours while employing 15 minute breaks in every 15 minutes of milling, in order to prevent excessive heating of the jar. The jar was then moved to an Ar filled glovebox to recover the powder.

Example 3

Example 2 was pelletized at 530 MPa with a 6 mm diameter die. The pellet was vacuum sealed in a carbon coated quartz tube, then the tube was annealed at 200° C. for 84 hours. After the annealing step, the tube was slowly cooled down to RT, and it was opened in an Ar filled glovebox to recover the sample.

Example 4 (Comparative)

$Li_2S$ and $P_2S_5$ (both produced by Sigma Aldrich) were used as starting materials. 1.5 g of total powder at a molar ratio of 7:3 were put in a 45 mL $ZrO_2$ jar with 12 $ZrO_2$ balls (3 g/ball, 10 mm diameter) in an Ar filled glovebox. The jar was sealed with scotch and parafilm to prevent air exposure, then was taken out of the glovebox and was placed in Fritzch Planetary Micro Mill Pulverisette 7. It was ball-milled with 510 RPM rotating speed for 76 hours while employing 15 minute breaks in every 5 minutes of milling, in order to prevent excessive heating of the jar. The jar was then moved in an Ar filled glovebox to collect the powder. The resulting white powder was pelletized at 530 MPa with a 10 mm diameter die. The pellet vacuum sealed in a carbon coated quartz tube, then the tube was annealed at 200° C. for 168 hours. After the annealing step, the tube was slowly cooled down to RT, and it was opened in an Ar filled glovebox.
Characterization Tools X-ray diffraction of the samples were collected using a Bruker D8 diffractometer with Cu Kα radiation at RT. The samples were sealed in a Be-equipped sample holder in an Ar filled glovebox prior to the experiment. The diffractions were collected in 2θ range of 10° to 100° in 13 hours. The lattice parameters were determined by fitting the diffraction profiles using Full-Prof Suite. Profile fitting procedures of Example 3 and Example 4 were limited in a shorter 2θ range (10° to 28°) to increase the accuracy of the fit because the high number of Bragg positions in P-1 space group at higher angles could mislead the fitting process. The small peaks which are attributed to the Be-equipped sample holder (see FIG. 4) were removed before the fitting process to increase the precision of the fitting.

The Raman spectra were collected using a Raman DXR Microscope (Thermo Fischer Scientific) with excitation laser beam wavelength of 532 nm and a low laser power of 0.1 mW to prevent excessive heating of the sample. The fitting processes were performed using Omnic Software of Thermo Fischer Scientific.

Before the impedance spectroscopy measurements, powder samples were cold-pressed in an Ar filled glovebox. Example 2 and Example 3 were pressed with a 6 mm diameter die with 530 MPa pressure, while Example 4 was pressed with a 10 mm diameter die with 530 MPa pressure. The pellets were then sandwiched between pre-dried carbon paper electrodes, and then loaded into air-tight sample holders. The AC impedance spectra were collected by using Biologic MTZ-35 frequency response analyser. During the measurements, the AC potential for excitation was set at 50 mV for all the samples. The frequency range of the measurement of Example 2 was 0.05 Hz to 30 MHz, whereas a range of 1 Hz to 30 MHz was applied in the measurements of Example 3 and Example 4. The spectrum of each sample was recorded at stabilized temperature values varying between −30° C. and 50° C. in steps of 10° C. The ionic conductivity values were obtained by fitting the data into equivalent circuit models using ZView software. The slopes of the σT versus 1/T plots were used to determine activation energy values.

Experimental Results

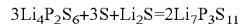

$3Li_4P_2S_6 + 3S + Li_2S = 2Li_7P_3S_{11}$                 Reaction 1:

The Bragg peaks observed in the XRD pattern of Example 1 show correlation to the simulated peak positions of crystalline $Li_4P_2S_6$ [1], as shown in FIG. 1. In the Raman spectrum of Example 1 in FIG. 3, the only peak centered at 383 $cm^{-1}$ is due to the vibration of P—S bond in $P_2S_6^{4-}$ anion [2,3]. Hence, the sample was considered phase pure and was used as a precursor in the Reaction 1.

The Reaction 1 was performed via mechanochemical synthesis route, and the reaction product was named as Example 2. As shown in FIG. 1, the product was X-ray amorphous, which indicated that the reagents were successfully amorphized. It is known in the literature that when $Li_2S$ (<75 at %) and $P_2S_5$ are used as reagents for the mechanochemical synthesis of Li—P—S compounds, the reaction leads to the formation of X-ray amorphous products, similar to the case of Example 2 [4-10]. Until today, a Li—P—S compound (i.e. $Li_7P_3S_{11}$) has never been synthesized using a different Li—P—S compound (i.e. $Li_4P_2S_6$) as precursor [6-10].

After the mechanochemical reaction, the vibrations of P—S bonds in $P_2S_7^{4-}$ and $PS_4^{3-}$ moieties appear in the Raman spectrum of Example 2, see FIG. 2. It is inferred from the drastic decrease in the intensity of the signal of $P_2S_6^{4-}$ unit that some of the phosphorus ions in the $P_2S_6^{4-}$ moieties were oxidized from +4 to +5 during the mechanochemical reaction. It is known that $P_2S_7^{4-}$ unit can be reacted to form $P_2S_6^{4-}$ unit by reducing the phosphorus at 280-300° C. [5,7]. It was shown for the first time with the Reaction 1 that the process could be reversed by a mechanochemical reaction.

The XRD pattern of Example 3 showed correlation to the simulated pattern of crystalline $Li_7P_3S_{11}$ [11], as evidenced by XRD in FIG. 3. Additional peaks with small intensity were also observed at 17.3°, 24.5° and 25.5°, which originate from the Be-equipped sample holder, with which the pattern of the powder was collected. The comparison of the pattern of Example 3 and the Be-equipped sample holder is presented in FIG. 4. The XRD pattern of Example 4, which was synthesized using $Li_2S$ and $P_2S_5$ as precursors was also shown in FIG. 3 for comparison. Several differences between Examples 3 and 4 were noted. Sharper peaks were present in the pattern of Example 3, which indicates higher crystallinity compared to Example 4. The lattice parameters of Examples 3 and 4 were obtained by profile fitting. The resulting fit and the Bragg positions were shown in FIG. 5. In the figure, the hollow circles indicate the collected data, and the black line indicates the resulting profile fit. Significant differences were observed in the profile parameters of Examples 3 and 4, and the reference from the literature [11], see Table 1. The unit cell of Example 3 has a drastically shorter lattice parameter a, and larger alpha and gamma angles compared to Example 4 and the material reported in the literature. Beta angle of Example 3 was observed to be larger than the literature example, but it was comparatively smaller than the one of Example 4. These results proved that the crystalline $Li_7P_3S_{11}$ obtained by the Reaction 1 was structurally different than the materials synthesized by starting from the conventional reagents $Li_2S$ and $P_2S_5$.

The results obtained from different characterization tools indicate that crystalline $Li_7P_3S_{11}$ can be synthesized by using an alternative synthesis route as described in the Reaction 1.

The resulting product (Example 3) according to the invention showed significant difference in terms of lattice parameters compared to the values reported in the literature, and the ones of the crystalline $Li_7P_3S_{11}$ that was synthesized by using $Li_2S$ and $P_2S_5$ as reagents (Example 4—comparative). Additionally, the relative ratios of the structural moieties in Examples 3 and 4 were calculated to be drastically different. It was also shown by the impedance spectra that the ionic conductivities of both examples and the materials reported in the literature are quite similar. It was also noted that a

TABLE 1

Lattice parameters, in triclinic P-1 description, for Examples 3 and 4 versus lattice parameters reported in the literature [11]

|  | a (Å) | b (Å) | c (Å) | alpha (°) | beta (°) | gamma (°) | V (Å$^3$) |
| --- | --- | --- | --- | --- | --- | --- | --- |
| Example 3 | 12.40 | 6.04 | 12.52 | 103.30 | 113.25 | 75.07 | 823 |
| Example 4 | 12.46 | 6.05 | 12.53 | 103.14 | 113.33 | 74.70 | 828 |
| Reference [11] | 12.50 | 6.03 | 12.53 | 102.85 | 113.20 | 74.47 | 829 |

The Raman spectra of Examples 3 and 4 show the presence of bond vibrations of $PS_4^{3-}$, $P_2S_7^{4-}$ and $P_2S_6^{4-}$ moieties at 421 cm$^{-1}$, 404 cm$^{-1}$ and 383 cm$^{-1}$, respectively, see FIG. 2. These results show correlation to the results published in the literature [7,8,10,12-15]. In order to make a semi-quantitative comparison of the quantities of the moieties in Examples 3 and 4, the spectra were fitted into three peaks centered at the reported positions of structural moieties [5]. The relative ratios of the peak areas were also compared. As shown in FIGS. 6 and 7, Examples 3 and 4 manifested drastic differences in their local structures.

Relative ratio of $PS_4^{3-}/P_2S_7^{4-}$ in Example 3 was calculated to be 0.28, whereas the ratio in Example 4 deviated significantly and was noted down as 0.55. It was also observed that the relative intensity of peak of $P_2S_6^{4-}$ units was 2.63% lower in the case of Example 3. These results clearly indicated that the material which was synthesized from the reagents $Li_2S$ and $P_2S_5$ possessed different structural properties than the material synthesized from a different Li—P—S compound as in the case of the Reaction 1.

The ionic conductivities of Examples 2, 3 and 4 were shown as a function of temperature (−30° C. to 20° C.) in FIG. 8. The activation energies were calculated from the σT vs 1/T plots using Equation 1, and the linear fits of the data to calculate the slope were also shown in FIG. 9:

$$\sigma * T = \sigma_0 * e^{-\frac{Ea}{kT}} \quad \text{Equation 1}$$

Example 2 demonstrated 5×10$^{-5}$ Scm$^{-1}$ conductivity at 20° C. with an activation energy of 0.40 eV. After the crystallization of $Li_7P_3S_{11}$ via subsequent annealing of Example 2, Example 3 showed a significant increase in the conductivity by 6×10$^{-4}$ S·cm$^{-1}$ at 20° C. The activation energy for the conduction was also decreased to 0.37 eV, which is smaller than that of Example 4 (0.38 eV), which was synthesized from the precursors $Li_2S$ and $P_2S_5$. Example 4 possessed a slightly higher ionic conductivity of 9×10$^{-4}$ Scm$^{-1}$ at 20° C. These results also show correlation to the values reported in the literature [6, 14-18].

successful reaction from one member of the $Li_2S—P_2S_5$ binary system to the other member has been reported for the first time in the literature. This discovery paves the way to finding other alternative reaction pathways between different members of the binary system.

REFERENCES

[1] S. Neuberger, S. P. Culver, H. Eckert, W. G. Zeier, J. Schmedt auf der Günne, Refinement of the crystal structure of Li4P2S6 using NMR crystallography, Dalt. Trans. (2018). doi:10.1039/C8DT02619J.

[2] C. Dietrich, M. Sadowski, S. Sicolo, D. A. Weber, S. J. Sedlmaier, K. S. Weldert, S. Indris, K. Albe, J. Janek, W. G. Zeier, Local Structural Investigations, Defect Formation, and Ionic Conductivity of the Lithium Ionic Conductor Li4P2S6, Chem. Mater. 28 (2016) 8764-8773. doi:10.1021/acs.chemmater.6b04175.

[3] M. Tachez, J. Malugani, R. Mercier, R. Guy, Ionic conductivity of and phase transition in Li thiophosphate Li3PS4, Solid State Ionics. 14 (1984) 181-185. doi: http://dx.doi.org/10.1016/0167-2738(84)90097-3.

[4] M. Tatsumisago, S. Hama, A. Hayashi, H. Morimoto, T. Minami, New lithium ion conducting glass-ceramics prepared from mechanochemical Li2S—P2S5 glasses, Solid State Ionics. 154 (2002) 635-640. doi:10.1016/S0167-2738(02)00509-X.

[5] C. Dietrich, D. A. Weber, S. J. Sedlmaier, S. Indris, S. P. Culver, D. Walter, J. Janek, W. G. Zeier, Lithium ion conductivity in Li2S—P2S5 glasses—building units and local structure evolution during the crystallization of superionic conductors Li3PS4, Li7P3S11 and Li4P2S7, J. Mater. Chem. A. 5 (2017) 18111-18119. doi:10.1039/C7TA06067J.

[6] Y. Seino, T. Ota, K. Takada, A. Hayashi, M. Tatsumisago, A sulphide lithium super ion conductor is superior to liquid ion conductors for use in rechargeable batteries, Energy Environ. Sci. 7 (2014) 627-631. doi: 10.1039/C3EE41655K.

[7] Y. Seino, M. Nakagawa, M. Senga, H. Higuchi, K. Takada, T. Sasaki, Analysis of the structure and degree of crystallisation of 70Li2S—30P2S5 glass ceramic, J. Mater. Chem. A. 3 (2015) 2756-2761. doi:10.1039/C4TA04332D.

[8] Y. Aoki, K. Ogawa, T. Nakagawa, Y. Hasegawa, Y. Sakiyama, T. Kojima, M. Tabuchi, Chemical and structural changes of 70Li2S—30P2S5 solid electrolyte during heat treatment, Solid State Ionics. 310 (2017) 50-55. doi:10.1016/j.ssi.2017.08.006.

[9] K. Minami, A. Hayashi, M. Tatsumisago, Crystallization Process for Superionic Li7P3S11 Glass-Ceramic Electrolytes, J. Am. Ceram. Soc. 94 (2011) 1779-1783. doi:10.1111/j.1551-2916.2010.04335.x.

[10] M. R. Busche, D. A. Weber, Y. Schneider, C. Dietrich, S. Wenzel, T. Leichtweiss, D. Schröder, W. Zhang, H. Weigand, D. Walter, S. J. Sedlmaier, D. Houtarde, L. F. Nazar, J. Janek, In Situ Monitoring of Fast Li-Ion Conductor Li7P3S11 Crystallization Inside a Hot-Press Setup, Chem. Mater. 28 (2016) 6152-6165. doi:10.1021/acs.chemmater.6b02163.

[11] H. Yamane, M. Shibata, Y. Shimane, T. Junke, Y. Seino, S. Adams, K. Minami, A. Hayashi, M. Tatsumisago, Crystal structure of a superionic conductor, Li7P3S11, Solid State Ionics. 178 (2007) 1163-1167. doi:10.1016/j.ssi.2007.05.020.

[12] R. C. Xu, X. H. Xia, Z. J. Yao, X. L. Wang, C. D. Gu, J. P. Tu, Preparation of Li7P3S11 glass-ceramic electrolyte by dissolution-evaporation method for all-solid-state lithium ion batteries, Electrochim. Acta. 219 (2016) 235-240. doi: 10.1016/j.electacta.2016.09.155.

[13] M. Calpa, N. C. Rosero Navarro, A. Miura, K. Tadanaga, Preparation of sulfide solid electrolytes in the Li2S—P2S5 system by a liquid phase process, Inorg. Chem. Front. (2017). doi:10.1039/C7QI00737J.

[14] Y. Wang, D. Lu, M. Bowden, P. Z. El Khoury, K. S. Han, Z. D. Deng, J. Xiao, J.-G. Zhang, J. Liu, Formation mechanism of Li7P3S11 solid electrolytes through liquid phase synthesis, Chem. Mater. (2018) acs.chemmater.7b04842. doi: 10.1021/acs.chemmater.7b04842.

[15] M. Calpa, N. C. Rosero Navarro, A. Miura, K. Tadanaga, Preparation of sulfide solid electrolytes in the Li2S—P2S5 system by a liquid phase process, Inorg. Chem. Front. (2018) 501-508. doi:10.1039/C7QI00737J.

[16] I. H. Chu, H. Nguyen, S. Hy, Y. C. Lin, Z. Wang, Z. Xu, Z. Deng, Y. S. Meng, S. P. Ong, Insights into the Performance Limits of the Li7P3S11 Superionic Conductor: A Combined First-Principles and Experimental Study, ACS Appl. Mater. Interfaces. 8 (2016) 7843-7853. doi:10.1021/acsami.6b00833.

[17] S. Wenzel, D. A. Weber, T. Leichtweiss, M. R. Busche, J. Sann, J. Janek, Interphase formation and degradation of charge transfer kinetics between a lithium metal anode and highly crystalline Li7P3S11 solid electrolyte, Solid State Ionics. 286 (2016) 24-33. doi:10.1016/j.ssi.2015.11.034.

[18] S. Ito, M. Nakakita, Y. Aihara, T. Uehara, N. Machida, A synthesis of crystalline Li7P3S11 solid electrolyte from 1,2-dimethoxyethane solvent, J. Power Sources. 271 (2014) 342-345. doi:10.1016/j.jpowsour.2014.08.024.

The invention claimed is:

1. A method of preparing a Li—P—S product, the method comprising at least the following steps:
   (a) mixing at least $Li_4P_2S_6$, $Li_2S$ and sulfur to obtain a first mixture;
   (b) heating the first mixture in an inert atmosphere, under vacuum or under $H_2S$ flow, for a period of time and at a temperature sufficient to produce the Li—P—S product; and
   (c) cooling and optionally powdering the Li—P—S product.

2. The method according to claim 1, wherein the Li—P—S product is selected from the group consisting of: $Li_7P_3S_{11}$, $Li_3PS_4$, $Li_9PS_6$, and $Li_{9.6}P_3S_{12}$.

3. The method according to claim 1, wherein the temperature in step (b) is comprised from 150° C. to 600° C.

4. The method according to claim 1, wherein the heating in step (b) is made over a time period of from 1 hour to 200 hours.

5. The method according to claim 1, wherein $Li_4P_2S_6$ is obtained from the reaction between $Li_2S$ and $P_2S_5$.

6. The Li—P—S product obtainable by the method of claim 1.

* * * * *